United States Patent
Mimura et al.

[11] Patent Number: 6,010,609
[45] Date of Patent: Jan. 4, 2000

[54] METHOD OF MAKING A MICROPRISM MASTER MOLD

[75] Inventors: Ikuo Mimura; Keiji Adachi, both of Sano, Japan

[73] Assignee: Nippon Carside Kogyo Kabushiki Kaisha, Tokyo, Japan

[21] Appl. No.: 09/011,405

[22] PCT Filed: Jul. 26, 1996

[86] PCT No.: PCT/JP96/02117

§ 371 Date: Jan. 28, 1998

§ 102(e) Date: Jan. 28, 1998

[87] PCT Pub. No.: WO97/04939

PCT Pub. Date: Feb. 13, 1997

[30] Foreign Application Priority Data

Jul. 28, 1995 [JP] Japan ................................. 7/211330

[51] Int. Cl.[7] .................................................. C25D 1/10
[52] U.S. Cl. ........................ 205/70; 264/2.5; 264/1.9; 425/808
[58] Field of Search ..................... 264/2.5, 1.9; 425/808; 205/70

[56] References Cited

U.S. PATENT DOCUMENTS

| | | | |
|---|---|---|---|
| 1,591,572 | 7/1926 | Stimson | 76/107.1 |
| 2,029,375 | 2/1936 | James | 88/78 |
| 2,380,447 | 7/1945 | Jungersen | 88/78 |
| 3,069,721 | 12/1962 | Arni et al. | 18/1 |
| 3,258,840 | 7/1966 | Hedgewick | 264/2.5 |
| 3,417,959 | 12/1968 | Schultz | 249/117 |
| 3,712,706 | 1/1973 | Stamm | 350/103 |
| 3,922,065 | 11/1975 | Schultz | 350/103 |
| 4,025,159 | 5/1977 | McGrath | 359/514 |
| 4,073,568 | 2/1978 | Heasley | 350/103 |
| 4,243,618 | 1/1981 | Van Arnam | 264/1 |
| 4,588,258 | 5/1986 | Hoopman | 350/103 |
| 4,775,219 | 10/1988 | Appeldorn et al. | 350/103 |

FOREIGN PATENT DOCUMENTS 61-41518 2/1986 Japan .

*Primary Examiner*—Kishor Mayekar
*Assistant Examiner*—Thao Tran

[57] ABSTRACT

This invention relates to a method of making a microprism master mold which is suitable for use in the production of cube-corner retroreflectors, especially in the form of thin retroreflective sheeting, and permits the formation of hexagonal prism type microprisms having both high reflectivity and excellent angularity. This method is characterized in that, in making a cube-corner microprism master mold by stacking a plurality of flat sheets having two mutually parallel major surfaces, cutting V-shaped grooves on one lateral surface of the resulting flat sheet stack in a direction perpendicular to the major surfaces and at a fixed pitch to form a series of successive roof-shaped projections having a vertical angle of about 90°, and then shifting the flat sheets so that the vertices of the roof-shaped projections formed on each flat sheet meet the bottoms of the V-shaped grooves formed on an adjacent flat sheet. The flat sheets having a thickness of 50 to 500 μm and made of a synthetic resin having a Rockwell hardness of not less than 70 are used.

5 Claims, 4 Drawing Sheets

$\frac{1}{2}L$

METHOD OF MAKING A MICROPRISM MASTER MOLD

This application is a 35 U.S.C. 371 National stage filing of PCT/JP96/02117 filed Jul. 26, 1996.

TECHNICAL FIELD

This invention relates to a method of making a microprism master mold for use in the production of cube-corner retroreflectors (i.e., articles reflecting most of the incident light back toward the light source). In particular, it relates to a method of making a microprism master mold which is suitable for use in the production of retroreflective elements useful in signs such as road signs and construction signs, license plates for vehicles such as automobiles and motorcycles, safety products such as safety clothing and life-saving devices, markings such as signboards, reflectors for visible light or laser light reflection sensors, and the like, as well as retroreflective sheeting composed of such retroreflective elements.

BACKGROUND ART

Conventionally, retroreflective sheeting capable of reflecting incident light back toward the light source have been well known, and such sheeting is widely used in the above-described fields of application due to its retroreflectivity. Among others, retroreflective sheeting utilizing the retroreflection principle of prisms, such as cube-corner retroreflective sheeting, has markedly higher optical retroreflection efficiency than conventional retroreflective sheeting using micro glass beads, and the range of its use is expanding every year because of its excellent retroreflection performance.

On the basis of their principle of reflection, cube-corner retroreflective elements exhibit high retroreflectivity, so long as the angle between the optical axis [i.e., an axis lying at an equal distance from three mutually perpendicular faces constituting the prismatic reflective elements (sometimes referred to simply as "prismatic element")] of a prismatic element and incident light (i.e., the entrance angle) is narrow. However, cube-corner retroreflective elements have the disadvantage that, as entrance angle increases, their retroreflection efficiency is reduced. Moreover, when rays of light are incident on a lateral face at an angle greater than the critical angle satisfying the conditions for total internal reflection which are determined according to the ratio of the refractive index of the transparent medium constituting the retroreflective element to the refractive index of air, most of them do not undergo total reflection at the interfaces of the prismatic element but pass to the back side of the prism. Thus, they have the additional disadvantage that the range of entrance angle which permits retroreflection is limited.

In order to overcome these disadvantages, various attempts have been made to improve the method of making a mold used for the formation of prisms. Some typical methods of making a prism mold which have been proposed in prior arts are described below.

(1) Bundled pin method (U.S. Pat. Nos. 1,591,572, 3,922, 065 and 2,029,375):

This is a method in which a large number of metallic pins having a prism formed at the tip thereof are bundled to form an array of prisms. This method is characterized in that the design of the prism formed at the tip of each pin may be arbitrarily modified and is suitable for the production of relatively large prisms. However, it is not practical when the formation of, for example, more than 2,000 microprisms per square centimeter is required as dictated by the object of the present invention.

(2) Plate method (U.S. Pat. Nos. 1,591,572, 3,069,721 and 4,073,568):

This is a method of making a microprism mold of the hexagonal prism type which comprises stacking a plurality of flat sheets having two mutually parallel major surfaces, cutting therein V-shaped grooves in a direction perpendicular to the major surfaces and at a fixed pitch to form a series of successive roof-shaped projections having a vertical angle of about 90°, and then shifting the flat sheets so that the vertices of the roof-shaped projections formed on each flat sheet meet the bottoms of the V-shaped grooves formed on an adjacent flat sheet. This method is characterized by a relatively better design freedom, though it is lower than that of the bundled pin method. This method can improve the poor productivity in the fabrication of a prism mold which constitutes a disadvantage of the above-described bundled pin method. However, this method has the disadvantage that, in case of forming microprisms, the insufficient strength of flat sheets may cause them to become distorted during the cutting of V-shaped grooves, and has hence been used for the production of relatively large prisms.

(3) Triangular prism method (U.S. Pat. Nos. 3,712,706 and 2,380,447):

This is a method in which V-shaped grooves extending in three different directions are cut in a surface of a flat plate made of a metal or the like to form an array of prisms thereon. This method has frequently been employed for the production of conventional retroreflective sheeting using prismatic elements. The reasons for this are that it is relatively easy to form microprisms by cutting and that thin retroreflective sheeting may be obtained because it is possible to form an array in which the bases of the formed triangular prisms are arranged in a common plane. However, this method has the disadvantage that the prism shape which can be employed is limited to triangular prisms capable of being formed by V-groove cutting and its degree of design freedom is low.

Next, the properties desired for retroreflective sheeting and the problems involved in cube-corner retroreflective sheeting using prismatic elements are described below.

Generally, the basic properties desired for retroreflective sheeting include high reflectivity (i.e., the highness of reflective brightness as represented by the reflective brightness of light incident on the sheeting from a direction perpendicular to the surface thereof) and angularity. Moreover, angularity involves the following three considerations.

A first consideration relating to angularity is observation angularity. Where retroreflective sheeting is used, for example, in various signs such as traffic signs, the location of the viewer is usually different from that of the light source. Accordingly, more intense light must reach the viewer positioned away from the axis of the entrance light. Therefore it is required that the reduction in reflectivity should be limited even at the location of wide observation angle to the axis of the incident light.

A second consideration relating to angularity is entrance angularity. For example, as an automobile is approaching closer to a traffic sign, the entrance angle of light emitted by the headlights of the automobile to the sign increases gradually, and the intensity of the light reaching the driver being the viewer decreases correspondingly. In order to cause the sign to retain sufficiently high reflectivity even when the river approaches to the sign, excellent entrance angularity is required.

A third consideration relating to angularity is rotational angularity. A phenomenon peculiar to prismatic elements is such that retroreflectivity varies according to the direction from which light is incident on the retroreflective sheeting. Consequently, retroreflective sheeting involves a troublesome problem which is that the sheeting should be applied in control of the direction of the sheeting when applying it to signs. Micro glass bead type retroreflective sheeting does not involve this problem because the reflective elements have the form of a body of revolution.

Usually, prismatic retroreflective sheeting is characterized in that the right retroreflectivity thereof is two to three times higher than that of bead type retroreflective sheeting, but it is generally said to have poor angularity. For this reason, in order to satisfy trihedral reflection requirements based on the retroreflection principle of cube corner, the angle of incidence must be relatively close to 0°, i.e., light must be incident on the retroreflective sheeting from a direction substantially perpendicular to the surface thereof. If the angle of incidence becomes greater, the light may fail to reach a second or third reflective lateral face and escape out of the prism, resulting in a reduction in retroreflection efficiency. Moreover, if the angle of incidence exceeds a certain limit, the conditions for total internal reflection are not satisfied, so that the incident light passes to the back side of the prism.

In order to overcome the above-described disadvantages, there has generally been employed a method wherein the optical axes of the prismatic elements, which are conventionally oriented so as to be perpendicular to the surface of the retroreflective sheeting, are slightly tilted in various directions to increase their retroreflection efficiency toward the tilting directions.

For example, in the triangular prismatic method, it has been proposed to vary slightly the angle of intersection of V-shaped grooves which generally intersect with each other at an angle of 60° (U.S. Pat. Nos. 4,588,258 and 4,775,219). Since the optical axes tilted by this method are obtained only in the form of pairs of prisms facing in opposite directions forming an angle of 180°, an improvement in angularity can be achieved in the directions of tilting of the optical axes, but no improvement is achieved in other directions. Moreover, no improvement in rotational angularity is achieved.

In order to overcome the above-described disadvantage that the conditions for total internal reflection are not satisfied when the entrance angle exceeds a certain limit, it has been proposed to coat the reflective lateral faces with a metal film or the like and thereby cause specular reflection (U.S. Pat. Nos. 3,712,706 and 2,380,447). However, this method has the disadvantage that the resulting sheeting has a dark appearance and the metal film is susceptible to moisture or the like.

Rotational angularity poses a serious problem especially in the case of triangular prisms. In order to improve rotational angularity, there is known a method in which the prism array surface is divided into plural sections of certain size and directions of sections are changed with respect to each other (see U.S. Pat. No. 4,243,618). In this method, the rotation angle of light incident on the prisms differs from section to section, and the reflectivity varies correspondingly. When viewed from a long distance, a whole reflectivity is leveled to give uniform rotational angularity. However, the sections of the prism array surface can be rather clearly seen from the front side of the retroreflective sheeting, and hence have the disadvantage that the appearance of the sheeting is reduced in attractiveness.

Moreover, in prism molds which can be applied to the fields of application of the present invention and can be used for the production of relatively thin and flexible retroreflective sheeting, it is desirable that the prismatic elements have a minute size, for example, of 500 μm or less. However, it is difficult to produce such reflective sheeting according to the above-described bundled pin method and plate method. The triangular prism method permits the formation of minute prisms, but it is difficult to carry out the design of prisms having excellent angularity as is another object of the present invention.

In the aforementioned U.S. Pat. No. 1,591,572 to Stimson, there is described a method for making a prism mold by using glass rods or sheets having one end formed into the shape of a prism or prisms. However, the flat sheets used in the method described therein has such low strength that this method is not suitable for the formation of microprisms desired in thin retroreflective sheeting as dictated by an object of the present invention.

It is described in the aforementioned U.S. Pat. No. 3,069,721 to Arni et al. that optically flat metal faces can be obtained by cutting flat metal sheets with a diamond cutter and that prism sheeting can be formed by using prism-forming metal sheets obtained by this method. However, neither description nor suggestion is given therein as to the formation of a microprism master mold having excellent characteristics by using thin flat sheets made of a synthetic resin.

It is an object of the present invention to provide a method of making a microprism master mold which is suitable for use in the production of cube-corner retroreflectors, in particular in the form of thin retroreflective sheeting, and permits the formation of hexagonal prism type microprisms having both high reflectivity and excellent angularity, by focusing attention on the above-described plate method and overcoming its disadvantages while maintaining its advantages.

DISCLOSURE OF THE INVENTION

According to the present invention, there is provided a method of making a cube-corner microprism master mold which comprises stacking a plurality of flat sheets having two mutually parallel major surfaces, cutting V-shaped grooves on one lateral surface of the resulting flat sheet stack in a direction perpendicular to the major surfaces and at a fixed pitch to form a series of successive roof-shaped projections having a vertical angle of about 90°, and then shifting the flat sheets so that the vertices of the roof-shaped projections formed on each flat sheet meet the bottoms of the V-shaped grooves formed on an adjacent flat sheet, characterized in that the flat sheets used have a thickness of 50 to 500 μm and in that the flat sheets are made of a synthetic resin having a Rockwell hardness of not less than 70.

The present invention will be more specifically described herein below with reference to the accompanying drawings.

DETAILED DESCRIPTION OF THE INVENTION

Figure 1:
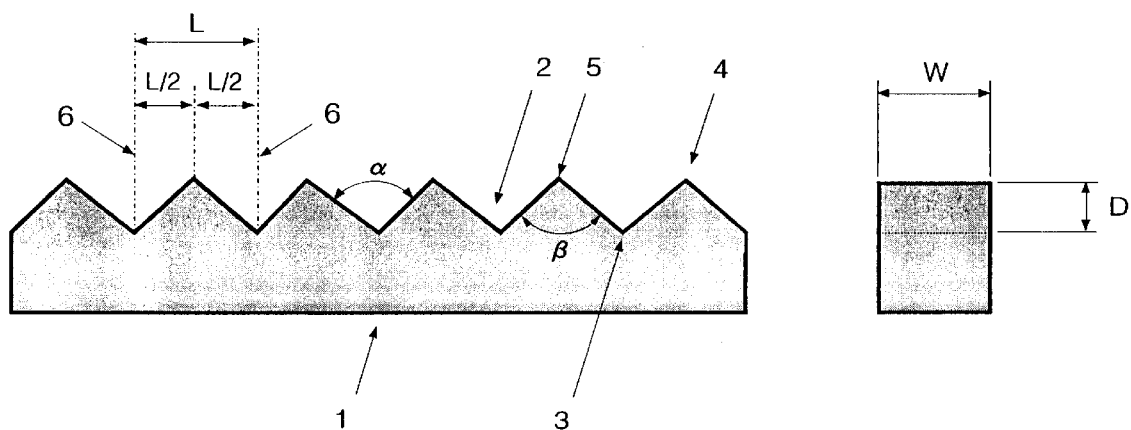
FIG. 1(A) is a cross-sectional view, taken in a direction parallel to the major surfaces, of a flat sheet having symmetrical roof-shaped projections formed thereon in accordance with one embodiment of the present invention.
FIG. 1(B) is a side view of the flat sheet as viewed from a direction perpendicular to the direction of the thickness.

In FIG. 1(A), symmetrical V-shaped grooves 2 and roof-shaped projections 4 are successively formed in the upper part of a flat sheet 1 at a fixed repeating pitch (L). Numeral 3 designates the bottom of each V-shaped groove 2 and numeral 5 designates the vertex of each roof-shaped projection 4. The distance between the bottom 3 of a V-shaped groove 2 and the vertex 5 of an adjacent roof-shaped projection 4, as measured in the lateral direction of the drawing, is equal to one-half of the repeating pitch (L). The bottom angle α of V-shaped grooves 2 and the vertical angle β of roof-shaped projections 4 are both equal to about 90°, and (α+β) is equal to 180°. Numeral 6 designates the projection of the optical axis of a formed prism on this sectional view. Moreover, in FIG. 1(B), the thickness of the flat sheet is designated by W and the depth of the V-shaped grooves by D.

Figure 2:
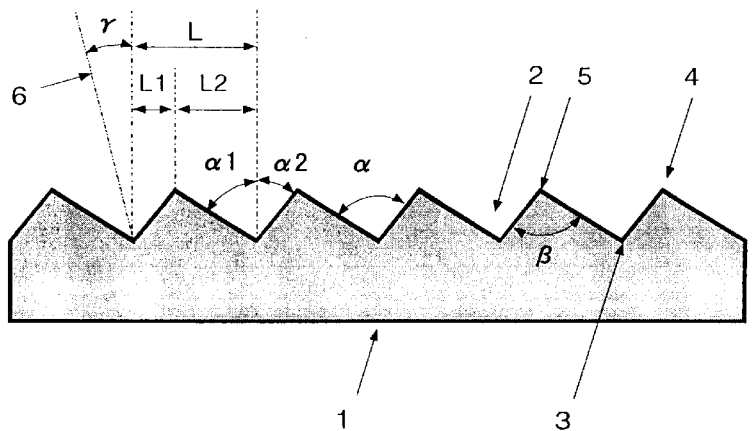
FIG. 2 is a sectional view of a flat sheet having asymmetrical roof-shaped projections formed thereon in accordance with another embodiment of the present invention.

In FIG. 2, asymmetrical V-shaped grooves 2 and roof-shaped projections 4 are successively formed in the upper part of a flat sheet 1 at an equal repeating pitch (L). The distance between the bottom 3 of a V-shaped groove 2 and the vertex 5 of an adjacent roof-shaped projection 4, as measured in the lateral direction of the drawing, is $L_1$ on the left-hand side of vertex 5 and $L_2$ on the right-hand side of vertex 5, and L is equal to $(L_1+L_2)$. The tilt angle of V-shaped grooves 2 is designated by γ. Similarly to FIG. 1(A), α and β designate the bottom angle of V-shaped grooves 2 and the vertical angle of roof-shaped projections 4. α and β are each equal to about 90°, and (α+β) is equal to 180°. Numeral 6 designates the projection of the optical axis of a prism on this sectional view, and the projection of the tilt angle of the optical axis of the prism on this sectional view coincides with the tilt angle γ of the V-shaped grooves. When the V-shaped grooves are cut one side by one side with unilateral cutting angles $\alpha_1$ and $\alpha_2$, the tilt angle γ of the V-shaped grooves is expressed by one-half of the difference between unilateral cutting angles $\alpha_1$ and $\alpha_2$, and the bottom angle α of the V-shaped grooves is expressed by the sum of unilateral cutting angles $\alpha_1$ and $\alpha_2$.

Where $\alpha_1 > \alpha_2$ as illustrated in FIG. 2, $\alpha_1$ and $\alpha_2$ may be varied in the respective ranges defined by $45° < \alpha_1 \leq 60°$, preferably $45° < \alpha_1 \leq 55°$, and $30° \leq \alpha_2 < 45°$, preferably $35° \leq \alpha_2 < 45°$. Accordingly, the tilt angle γ may be varied in the range defined by $0° < \gamma \leq 15°$, preferably $0° < \gamma \leq 10°$.

Now, several embodiments of the method of making a cube-corner microprism master mold according to the present invention by using a flat sheet stack (or flat sheet block) formed by stacking a plurality of flat sheets are described below with reference to FIGS. 3 to 10.

Figure 3:
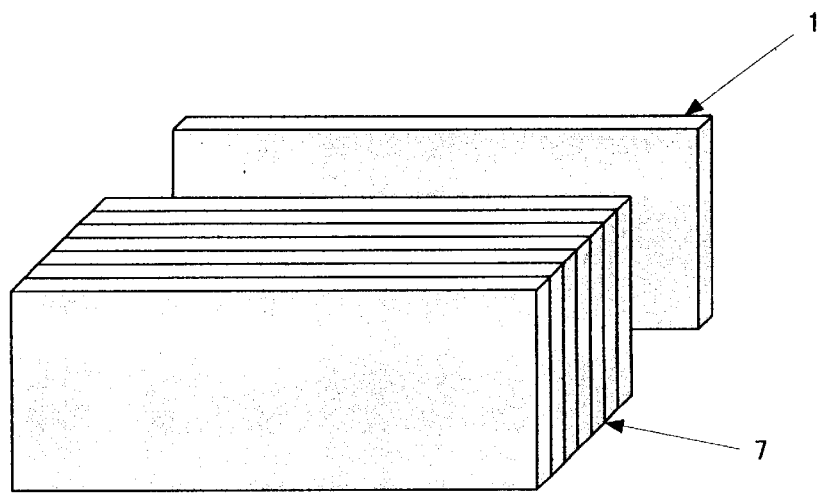
FIG. 3 is a perspective view of a block formed by stacking flat sheets and used in the present invention.
Figure 4:
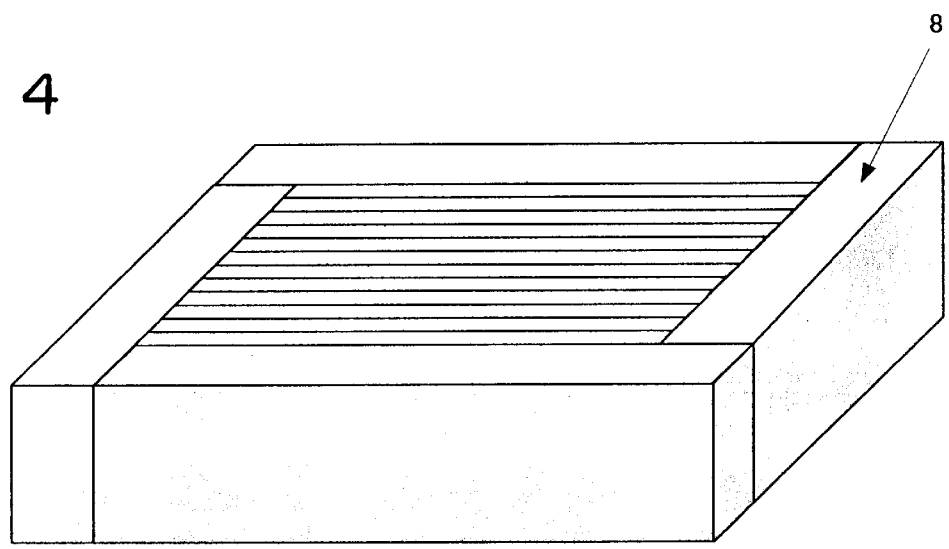
FIG. 4 is a perspective view showing the state in which the block formed as shown in FIG. 3 is fastened with a fastening jig.
Figure 5:
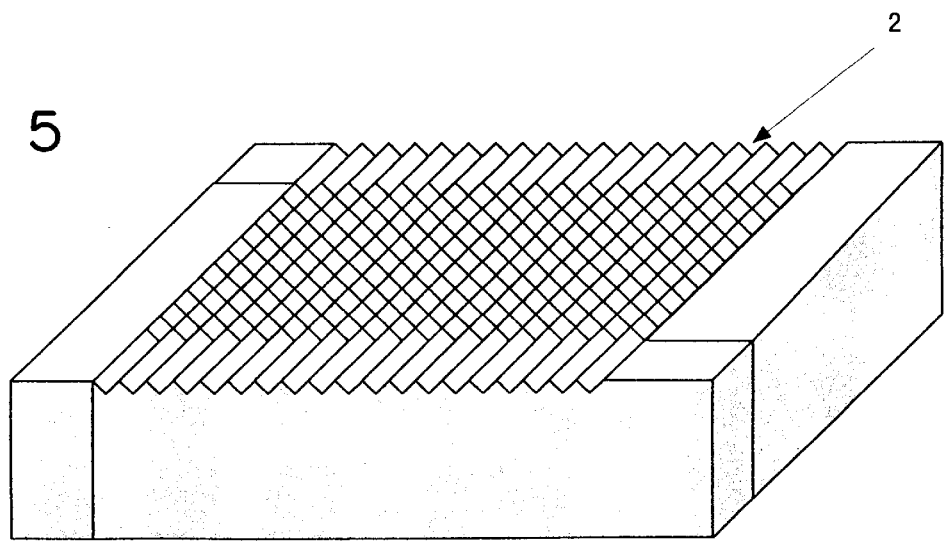
FIG. 5 is a perspective view showing the state in which the block fastened with a fastening jig as shown in FIG. 4 has been planed and then cut together with the fastening jig so as to form V-shaped grooves.

As illustrated in FIG. 3, a flat sheet block 7 is formed by stacking a plurality of flat sheets 1. Then, as illustrated in FIG. 4, this block 7 is firmly secured with a fastening jig 8 so that flat sheets 1 will not move during cutting. Subsequently, according to a suitable cutting process such as a fly cutting process, a lateral surface of block 7 in which the edge surfaces of flat sheets 1 extending in the direction of the thickness thereof are exposed (i.e., the upper lateral surface in FIG. 4) are planed together with fastening jig 8 so that the planed surface will generally have a degree of flatness within 1 μm and preferably within 0.5 μm. Thereafter, as illustrated in FIG. 5, V-shaped grooves 2 are cut in the planed surface so that symmetrical roof-shaped projections 4 having a vertical angle (β) of 90° are formed in a direction perpendicular to the major surface of flat sheets 1 and at a fixed pitch (L). The cutting of V-shaped grooves may be performed, for example, according to a fly cutting process using a cutting tool having diamond mounted at its tip. The accuracy of cutting should preferably be such that the resin microprisms formed with the prism master mold obtained by this process will have an average surface roughness (Ra) of not greater than 0.05 μm and more preferably not greater than 0.01 μm.

Figure 6:
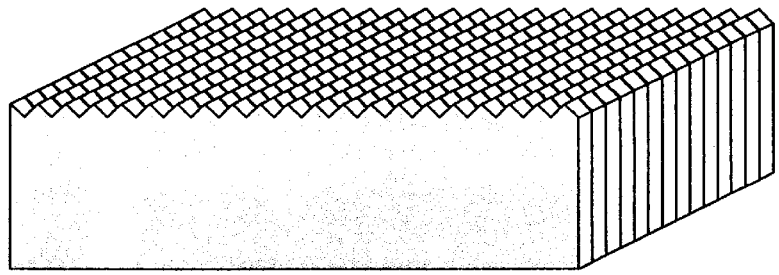
FIG. 6 is a perspective view of the block which has been subjected to the cutting operation and removed from the fastening jig.
Figure 7:
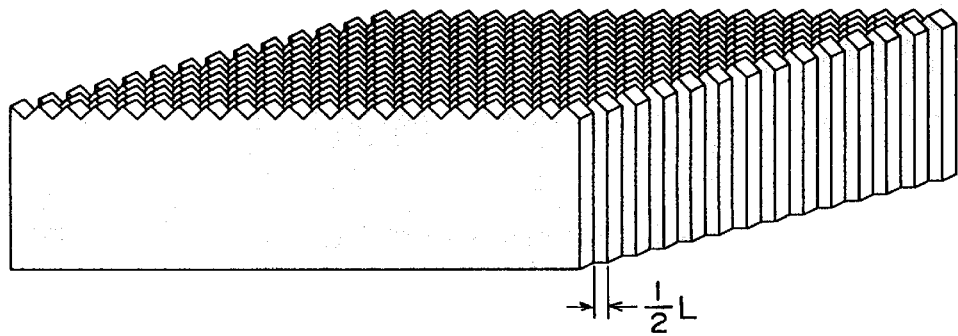
FIG. 7 is a schematic view showing the state of the block of FIG. 6 in which the flat sheets have been shifted in a direction parallel to the major surfaces thereof by one-half of the cutting pitch.
Figure 8:
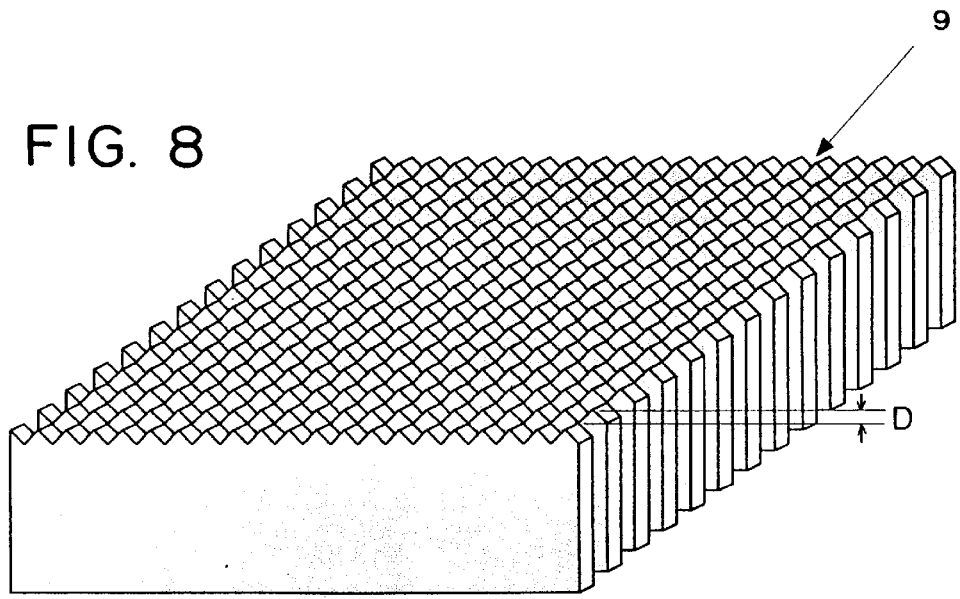
FIG. 8 is a schematic view showing the state of the block of FIG. 6 in which, after the flat sheets were shifted in the direction parallel to the major surfaces thereof by one-half of the cutting pitch, they have further been shifted in the vertical direction by the cutting depth to obtain a microprism master mold.

Next, as illustrated in FIG. 6, the flat sheet block 7 having a series of roof-shaped projections formed in the above-described manner is removed by loosening the fastening jig 8. Subsequently, each flat sheet is shifted in a direction parallel to the major surface of the flat sheet by one-half (½L) of the cutting pitch (L) as illustrated in FIG. 7, and further shifted in the vertical direction by the cutting depth (D) as illustrated in FIG. 8, so that the vertices 5 of the series of roof-shaped projections formed on each flat sheet are made to meet the bottom 3 of the V-shaped grooves in the series of roof-shaped projections formed on an adjacent flat sheet. Thus, a microprism master mold 9 is formed.

In cutting roof-shaped projections 4, the vertical angle (β) thereof need not necessarily be exactly equal to 90°, but may be varied slightly from 90°, for example, in the range of about 89.8° to 90.2°. This can spread the beam of retroreflected light and thereby bring about an improvement in observation angle characteristics.

Figure 9:
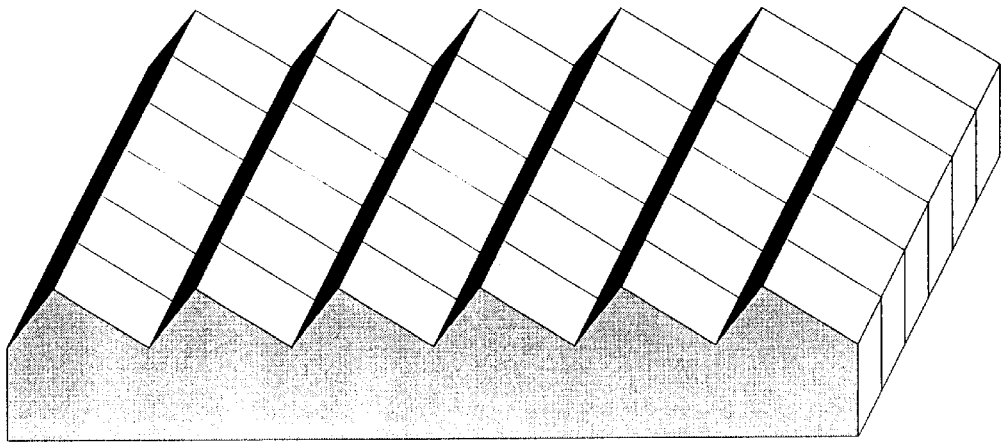
FIG. 9 is a perspective view of a block having asymmetrical roof-shaped projections formed thereon.
Figure 10:
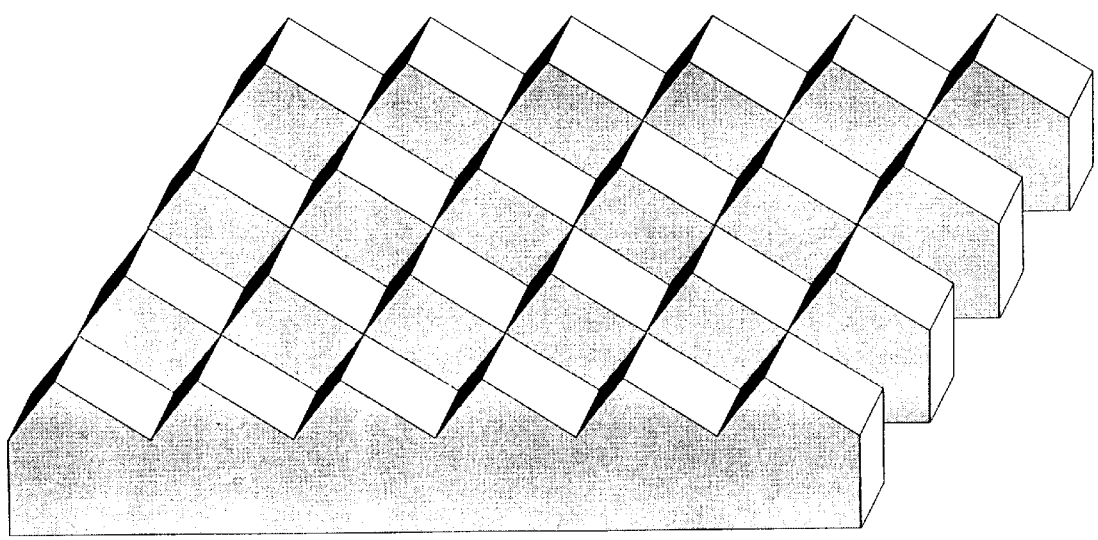
FIG. 10 is a perspective view of a microprism master mold obtained by shifting the flat sheets constituting the block having asymmetrical roof-shaped projections formed thereon as shown in FIG. 9.

Moreover, V-shaped grooves having a desired tilt angle (i.e., an angle of deviation from a direction perpendicular to the surface of the retroreflective sheeting) (γ) may be formed by cutting them while tilting the center line of each V-shaped groove (i.e., the bisector of the bottom angle of the V-shaped groove which corresponds to line 6 shown in FIG. 2) suitably to the right or left side. Thus, asymmetrical roof-shaped projections 4 as illustrated in FIGS. 2 and 9 can be formed. Such asymmetrical V-shaped grooves may be cut by using a cutting tool having a tip angle of about 90° while tilting it by a desired tilt angle, or by cutting each V-shaped groove on one side after the other with a cutting tool having a definite acute tip angle while tilting it by a desired tilt angle. In the latter case, V-shaped grooves having any desired tilt angle can be cut, provided that the sum of the two unilateral cutting angles is adjusted to about 90°. In a flat sheet block 7 having a series of asymmetrical roof-shaped projections formed in the above-described manner, each flat sheet is shifted by $L_1$ in a rightward direction parallel to the major surface of the flat sheet (or by $L_2$ in a leftward direction parallel to the major surfaces of the flat sheet) as illustrated in FIG. 7, and further shifted in the vertical direction by the cutting depth (D) as illustrated in FIG. 8, so that the vertices of the series of roof-shaped projections formed on each flat sheet are made to meet the bottom 3 of the V-shaped grooves in the series of roof-shaped projections formed on an adjacent flat sheet. Thus, a microprism master mold as illustrated in FIG. 10 can be formed.

Let us suppose that, when the V-shaped grooves are tilted to the left side (or in the counterclockwise direction) with respect to a direction perpendicular to the surface of the retroreflective sheeting, the tilt angle ($\gamma$) thereof is expressed by a negative value, and when they are tilted to the right side (or in the clockwise direction), the tilt angle ($\gamma$) thereof is expressed by a positive value. Then, the tilt angle ($\gamma$) of the V-shaped grooves should preferably be in the range of $-15°$ to $+15°$ and more preferably $-10°$ to $+10°$, inclusive of the case in which the V-shaped grooves are not tilted (i.e., the tilt angle thereof is 0°).

Alternatively, roof-shaped projections may be cut on a stack of flat sheets in which adjacent flat sheets are previously displaced from each other by a distance to be shifted in a direction parallel to the major surface of the flat sheets after cutting. In this case, a microprism master mold can be formed by re-arranging the flat sheets so as to eliminate the mutual displacement thereof, and then shifting the flat sheets in the vertical direction by the cutting depth so that the vertices of the series of roof-shaped projections formed on each flat sheet meet the bottom of the V-shaped grooves in the series of roof-shaped projections formed on an adjacent flat sheet.

In the present invention, the formation of a microprism master mold is carried out by using flat sheets having smooth major surfaces and a thickness of 50 to 500 $\mu$m. If the thickness of the flat sheet is less than 50 $\mu$m, the formed prisms have an unduly small aperture size and hence present the disadvantage that the beam of retroreflected light is excessively spread by a diffraction effect to cause a reduction in the retroreflectivity of the prisms. If the thickness of the flat sheet is greater than 500 $\mu$m, it is generally impossible to form thin and flexible prismatic retroreflective sheeting. Preferably, the thickness of the flat sheet is in the range of 60 to 200 $\mu$m. Moreover, the flat sheet used need not have an identical thickness, but two or more types of flat sheets having different thicknesses may be used in combination.

In order to overcome the above-described disadvantage of the plate method in that the insufficient strength of thin flat sheets used for the formation of microprisms may cause them to become distorted during the cutting of V-shaped grooves, the present invention is characterized by using flat sheets made of a specific material, i.e., flat sheets made of a synthetic resin having a Rockwell hardness (JIS Z2245) of not less than 70 and preferably not less than 75.

The synthetic resins which can suitably be used for the fabrication of flat sheets in the present invention are preferably thermoplastic or thermosetting synthetic resins which have not only the above-defined hardness but also a glass transition temperature of 150° C. or above and more preferably 200° C. or above. For example, they seldom have the disadvantage of softening during cutting and thereby making high precision cutting difficult. Preferred examples thereof include polyethylene terephthalate resin, polybutylene terephthalate resin, polycarbonate resins, polymethyl methacrylate resin, polyimide resins, polyarylate resins, polyethersulfone resins, polyetherimide resins and cellulose triacetate resin. Among them, polyethylene terephthalate resin, polymethyl methacrylate resin and polycarbonate resins are suitable for practical purposes because of their availability, processability and the like.

In order to facilitate their formation into thin flat sheets, suitable modifiers, processing aids and the like may be added to the above-described synthetic resins.

The fabrication of flat sheets from a synthetic resin as described above may be carried out according to an ordinary resin forming technique such as extrusion molding, calendering or solution casting. If necessary, the resulting flat sheets may be subjected to additional treatments such as heat treatment and stretching. The major surfaces of the flat sheets so fabricated may be subjected to a preliminary conductivity treatment, in order to facilitate a conductivity treatment and/or an electroforming process which will be carried out to form an electroformed mold from the prism master mold made by the method of the present invention. As the preliminary conductivity treatment, there may be employed vacuum evaporation involving the deposition of a metal such as gold, silver, copper, aluminum, zinc, chromium, nickel or selenium; cathode sputtering using such a metal; or electroless plating using copper or nickel. Alternatively, the flat sheets themselves may be made electrically conductive by incorporating an electrically conductive fine powder (e.g., carbon black) or an organic metallic salt into the synthetic resin.

The surface of the synthetic resin microprism master mold made by the method of the present invention is subjected to an electroforming process for forming a metal coating thereon. Then, this metal coating may be removed from the surface of the master mold to obtain a metallic mold for use in the molding of, for example, microprismatic sheeting as a cube-corner retroreflector.

In the case of a master mold made of a synthetic resin, the lateral faces of the master mold must be subjected to a conductivity treatment for imparting electrical conductivity thereto, prior to an electro-forming process. For this conductivity treatment, there may be employed, for example, silvering, electroless plating, vacuum evaporation or cathode sputtering.

According to a specific silvering process, the surface of the master mold made in the above-described manner is cleaned with an alkaline detergent or the like to remove any contaminants (e.g., oily matter) therefrom, activated with a surface activator such as tannic acid, and then silvered quickly with the aid of a silver nitrate solution. For this silvering purpose, there may be employed, for example, a spray process in which an aqueous solution of silver nitrate and an aqueous solution of a reducing agent (e.g., glucose or glyoxal) are sprayed with a double-cylinder nozzle gun, or a dipping process in which the master mold is dipped into a mixture of an aqueous solution of silver nitrate and an aqueous solution of a reducing agent. The silver coating should preferably be as thin as possible, so long as electrical conductivity is secured during electroforming. For example, its thickness may be 0.1 $\mu$m or less.

For the purpose of electroless plating, copper, nickel and the like may be used. In an electroless nickel plating solution, a water-soluble nickel salt such as nickel sulfate or nickel chloride may be used. Moreover, a complexing agent comprising of a solution containing a salt of citric acid or malic acid as a principal component, and a reducing agent such as sodium hypophosphite, sodium borohydride or aminoborane are added to the plating solution.

Vacuum evaporation may be carried out by cleaning the surface of the master mold in the same manner as for silvering, placing the master mold in a vacuum chamber, and vaporizing a metal (e.g., gold, silver, copper, aluminum, zinc, nickel, chromium or selenium) therein by the application of heat to deposit it on the cooled surface of the master mold and thereby form an electrically conductive coating. Cathode sputtering may be carried out by using a vacuum chamber provided therein with a smooth cathode plate on which a desired metal foil can be mounted, and an anode stand made of a metal such as aluminum or iron and serving to place thereon a material to be treated. The master mold pretreated in the same manner as for silvering is placed on the anode stand, and a metal foil similar to that used for vacuum evaporation is mounted on the cathode and a voltage is applied thereto so as to cause a glow discharge. The resulting stream of positive ions is made to impinge on the metal foil of the cathode, so that metal atoms or fine metal particles are evaporated and deposited on the surface of the master mold to form an electrically conductive coating thereon. The electrically conductive coatings formed by these methods may have a thickness of, for example, 300 Å.

In order to obtain a smooth and uniform electroformed layer on the synthetic resin prism master mold during electroforming, the whole surface of the master mold must be uniformly subjected to the above-described conductivity treatment. If the conductivity treatment is not uniform, defects may develop, for example, in that the smoothness of the surface of the electroformed layer is reduced or the formation of an electroformed layer is omitted, in regions having poor electrical conductivity.

In order to avoid such defects, there may be employed, for example, a method in which, immediately before silvering, the surface to be silvered is treated with a solvent such as alcohol to improve its wettability by the silvering solution. However, since the synthetic resin prism master mold made according to the present invention has very deep and sharp recesses, its improvement in wettability tends to be insufficient. Defects of the electrically conductive coating due to the shape of such recesses also tend to develop during vacuum evaporation and the like.

Moreover, if the flat sheets of synthetic resin stacked to form a master mold have a nonuniform thickness, these flat sheets may fail to come into close contact with each other. As a result, defects tend to develop, for example, in that the electrically conductive coating formed on the surface of the master mold may be broken at the innerfaces between the flat sheets. All of these defects will interfere with the formation of a uniform electroformed layer.

In order to avoid such defects, both major surfaces of the flat sheets of synthetic resin used for the formation of a master mold may be subjected to a preliminary conductivity treatment as described previously. Since this preliminary conductivity treatment serves to improve wettability by a silvering solution and, in particular, to improve electrical conductivity between sheets, it is particularly effective in eliminating defects due to poor contact of the sheets.

The synthetic resin master mold having an electrically conductive coating formed thereon is subjected to various pretreatments so that uniform electroforming may be performed.

In order to obtain an electroformed layer having a smooth surface as a result of electroforming, an activation treatment is often carried out. For this activation treatment, there may be employed, for example, a method which comprises dipping the master mold into a 10 wt. % aqueous solution of sulfamic acid.

When the master mold having undergone silvering is subjected to electroforming, the silver layer becomes integral with the electroformed layer and can hence be easily stripped from the synthetic resin master mold. However, when an electrically conductive coating of nickel or the like is formed by electroless plating or cathode sputtering, the contact between the synthetic resin surface and the electrically conductive coating is so good that, after electroforming, it may be difficult to strip the electroformed layer from the synthetic resin layer. In such a situation, it is advisable to subject the electrically conductive coating to a so-called stripping treatment (e.g., a chromate treatment) prior to electroforming. In this case, the electrically conductive coating remains on the synthetic resin layer after the electroformed layer is stripped.

After these various pretreatments, the synthetic resin prism master mold having an electrically conductive coating formed thereon is subjected to an electroforming process in which an electroformed layer is produced on the electrically conductive coating.

The electroforming process is generally carried out, for example, in a 60 wt. % aqueous solution of nickel sulfamate and under conditions including a temperature of 40° C. and a current density of about 10 A/dm$^2$. A uniform electroformed layer can readily be obtained by adjusting the deposition rate of the electroformed layer, for example, to about 48 hours/mm or less. If the deposition rate is higher, defects such as poor smoothness of the surface and omissions in the electroformed layer tend to develop.

In the electroforming process, nickel-cobalt alloys containing cobalt and other components may also be used in order to improve the surface abrasion resistance of the resulting mold. The Vickers hardness (Hv) of the resulting electroformed layer can be increased to 300–400 by adding 10–15% by weight of cobalt. Consequently, the durability of the mold can be improved when a synthetic resin is molded by use of the resulting electroformed mold to produce microprismatic sheeting as a retroreflector product.

The first-generation electroformed mold made in the above-described manner may be repeatedly used as an electroforming master for making second-generation electroformed molds. Thus, a plurality of electroformed molds may be made from one prism master mold.

A plurality of electroformed molds so made may be precisely cut into sections. These sections may be combined and joined together so as to give a final mold size suitable for the molding of a synthetic resin into microprismatic sheeting. For joining purposes, there may employed, for example, a method in which the cut ends are simply butted together, and a method in which the joints of the combined sections are welded according to a technique such as electron beam welding, YAG laser welding or carbon dioxide laser welding.

The electroformed mold so combined is used as a mold for the molding of synthetic resins. As the method for the molding of synthetic resins, there may be employed compression molding or injection molding.

Compression molding may be carried out, for example, by inserting a thin-walled electroformed mold formed of nickel, synthetic resin sheeting of predetermined thickness, and about 5 mm thick silicone rubber sheeting as a cushioning material into a compression molding press, preheating them for 30 seconds under a pressure equal to 10–20% of the molding pressure, and then heating and pressing them at a temperature of 180–250° C. and a pressure of about 10–30 kg/cm$^2$ for about 2 minutes. Thereafter, they are cooled to room temperature in the pressed state and the pressure is released to obtain a molded prismatic product.

Alternatively, a product in the form of continuous sheeting may also be produced as follows. For example, a thin-walled (about 0.5 mm thick) electroformed mold made in the above-described manner is joined according to a welding process as described above to form an endless belt mold. This belt mold is mounted on a pair of rolls comprising a heating roll and a cooling roll, and allowed to travel. While the belt mold is lying on the heating roll, a molten synthetic resin in the form of sheeting is fed thereto and pressed with one or more silicone rolls. Thereafter, the synthetic resin sheeting is cooled on the cooling roll to a temperature lower than its glass transition temperature and stripped from the belt mold to obtain a desired product.

The above-described method of the present invention makes it possible to make a microprism master mold according to the plate method. Moreover, since the microprisms formed from the master mold made by the method of the present invention are hexagonal prisms, they show an increase in effective area contributing to retroreflection, as compared with triangular prisms of which are commonly used in thin retroreflective sheeting. Consequently, they are characterized by higher reflectivity and rotational angularity.

EXAMPLES

The present invention is further illustrated by the following examples.

Example 1

A total of 1,000 flat sheets made of polyethylene terephthalate with a Rockwell hardness of 70 and a softening point of 220° C. and measuring 75 mm (width)× 200 mm (length)×100 $\mu$m (thickness) were stacked to form a polyethylene terephthalate resin block having a width of 100 mm, a length of 200 mm and a height of 75 mm(FIG. 3).

Using a fastening jig, two faces of this block were firmly secured so that the polyethylene terephthalate sheets would not move during cutting. Then, according to a fly cutting process using a cutting tool having a diamond mounted at its tip, a surface of this fastened block in which the edge surfaces of the sheets were exposed was planed so that the cut surface was perpendicular to the major surfaces of the sheets (FIG. 4).

Thereafter, according to a fly cutting process using a diamond cutting tool having a vertical angle of 90°, V-shaped grooves having a depth of 70.7 $\mu$m were repeatedly cut at a repeating pitch of 141.4 $\mu$m in a direction perpendicular to the major surface of the sheets. Thus, a series of successive roof-shaped projections having a vertical angle of 90° were formed on one edge of the sheets (FIGS. 5 and 6).

In the resulting bundle of flat sheets having a series of roof-shaped projections formed in a repeating pattern, each sheet was first shifted in a direction parallel to the major surfaces of the sheet by one-half of the repeating pitch of the grooves (FIG. 7), and then shifted in the direction of the depth of the grooves by the depth of the grooves, so that the vertices of the series of roof-shaped projections formed on the sheet were made to meet the bottoms of the grooves in an adjacent series of roof-shaped projections. Thus, a microprism master mold made of polyethylene terephthalate was formed (FIG. 8).

Example 2

A microprism master mold made of polycarbonate was formed in the same manner as in Example 1, except that the polyethylene terephthalate sheets were replaced by polycarbonate sheets (with a Rockwell hardness of 75 and a softening point of 240° C.) and having the same size (i.e., the same width, length and thickness).

Example 3

A microprism master mold made of polymethyl methacrylate was formed in the same manner as in Example 1, except that the polyethylene terephthalate sheets were replaced by polymethyl methacrylate sheets (with a Rockwell hardness of 98 and a softening point of 180° C.) and having the same size.

Example 4

A microprism master mold made of polyethylene terephthalate sheets was formed in the same manner as in Example 1, except that flat sheets obtained by depositing gold on both major surfaces of polyethylene terephthalate sheeting having a thickness of 100 $\mu$m (i.e., the same thickness as that of the flat sheets used in Example 1) by vacuum evaporation and then cutting the sheeting into pieces having a width of 75 mm and a length of 200 mm were used.

Example 5

The surface of the prism master mold formed of polyethylene terephthalate sheets in Example 1 was cleaned with an alkaline detergent and activated with tannic acid used as a surface activator. Then, according to a spray method using a double-cylinder nozzle gun containing an aqueous solution of silver nitrate and an aqueous solution of a reducing agent, the surface of the master mold was silvered to form an electrically conductive coating thereon.

Subsequently, this master mold having an electrically conductive coating formed thereon was dipped into a 10 wt. % aqueous solution of sulfamic acid to activate the surface of the electrically conductive coating, and then subjected to an electroforming process which was carried out in a 60 wt. % aqueous solution of nickel sulfamate at 40° C. and 8 A/dm$^2$ for 48 hours.

The electroformed layer obtained by the electroforming process was stripped from the master mold to obtain a 0.8 mm thick electroformed nickel mold having an array of cube-corner elements thereon.

The electroformed mold thus obtained, 0.5 mm thick polycarbonate sheeting, and about 5 mm thick silicone rubber sheeting as a cushioning material were inserted into a compression molding press heated to 250° C., preheated for 30 seconds under a pressure of 2 kg/cm$^2$, and then compression-molded at a temperature of 240° C. and a pressure of 20 kg/cm$^2$ about 10–30 kg/cm$^2$ for about 2 minutes. Thereafter, they were cooled to room temperature in the pressed state and the pressure is released to obtain polycarbonate prismatic sheeting useful as a retroreflector.

Example 6

Polycarbonate prismatic sheeting as a retroreflector was made in the same manner as in Example 5, except that the microprism master mold formed of polyethylene terephthalate sheets in Example 1 was replaced by the microprism master mold formed of polyethylene terephthalate sheets in Example 4.

We claim:

1. A method of making a cube-corner microprism master mold which comprises stacking a plurality of flat sheets having two mutually parallel major surfaces, cutting V-shaped grooves on one lateral surface of the resulting flat sheet stack in a direction perpendicular to the major surfaces and at a fixed pitch to form a series of successive roof-shaped projections having a vertical angle of about 90°, and then shifting the flat sheets so that the vertices of the roof-shaped projections formed on each flat sheet meet the bottoms of the V-shaped grooves formed on an adjacent flat sheet, characterized in that the flat sheets used have a thickness of 50 to 500 μm and in that the flat sheets are made of a synthetic resin having a Rockwell hardness of not less than 70.

2. A method as claimed in claim 1 wherein the flat sheets have a thickness of 60 to 200 μm.

3. A method as claimed in claim 1 wherein the synthetic resin is one having a glass transition point of 150° C. or above.

4. A method as claimed in claim 1 wherein the synthetic resin is selected from the group consisting of polyethylene terephthalate resin, polybutylene terephthalate resin, polycarbonate resins, polymethyl methacrylate resin, polyimide resins, polyarylate resins, polyethersulfone resins, polyetherimide resins and cellulose triacetate resin.

5. A method of making a cube-corner microprism mold which comprises, after optionally imparting electrical conductivity to a cube-corner microprism master mold made by the method of claim 1, subjecting the master mold to a surface treatment for electroforming and an electroforming process, and stripping the resulting electroformed mold from the master mold.

* * * * *